(12) United States Patent
Sutherland

(10) Patent No.: US 8,475,729 B2
(45) Date of Patent: Jul. 2, 2013

(54) METHODS FOR FORMING HONEYCOMB MINIREACTORS AND SYSTEMS

(75) Inventor: James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 681 days.

(21) Appl. No.: 12/623,737

(22) Filed: Nov. 23, 2009

(65) Prior Publication Data

US 2010/0132928 A1 Jun. 3, 2010

Related U.S. Application Data

(60) Provisional application No. 61/118,625, filed on Nov. 30, 2008.

(51) Int. Cl.
*B01J 8/02* (2006.01)
*B01J 35/02* (2006.01)
*B01J 19/00* (2006.01)
*B01J 8/00* (2006.01)
*B01J 8/04* (2006.01)
*B01D 53/34* (2006.01)
*B21D 51/16* (2006.01)

(52) U.S. Cl.
USPC ........... 422/222; 422/129; 422/130; 422/168; 422/177; 422/180; 422/187; 422/198; 422/211; 422/218; 422/600; 422/603; 422/630; 422/631; 422/633; 29/890

(58) Field of Classification Search
USPC ................. 422/129, 130, 168, 177, 180, 211, 422/218, 222, 187, 600, 603, 630, 631, 633; 264/137, 165, 168; 29/592, 890
See application file for complete search history.

(56) References Cited

U.S. PATENT DOCUMENTS

| | | | | |
|---|---|---|---|---|
| 4,041,591 | A | 8/1977 | Noll et al. | 29/157.3 |
| 5,036,909 | A | 8/1991 | Whitehead et al. | 165/133 |
| 5,076,354 | A | 12/1991 | Nishishita | 165/146 |
| 5,339,892 | A | 8/1994 | Clifton | 165/82 |
| 5,373,634 | A * | 12/1994 | Lipp | 29/890.03 |
| 8,211,376 | B2 * | 7/2012 | Caze et al. | 422/222 |
| 8,211,377 | B2 * | 7/2012 | Caze et al. | 422/222 |
| 2005/0217839 | A1 | 10/2005 | Papapanu | 165/185 |
| 2006/0108397 | A1 | 5/2006 | Tonkovich et al. | 228/101 |
| 2006/0153751 | A1 | 7/2006 | Tonkovich et al. | 422/190 |
| 2007/0128028 | A1 | 6/2007 | Liang | 416/97 |
| 2007/0261647 | A1 | 11/2007 | Albrecht et al. | 122/406.1 |

(Continued)

FOREIGN PATENT DOCUMENTS

| | | |
|---|---|---|
| WO | WO2004/068053 | 8/2004 |
| WO | WO2005/063379 | 7/2005 |
| WO | WO2007/079140 A2 | 7/2007 |
| WO | WO2008/121390 A1 | 10/2008 |

*Primary Examiner* — Jill Warden
*Assistant Examiner* — Natasha Young
(74) *Attorney, Agent, or Firm* — Gregory V. Bean

(57) ABSTRACT

A method of forming a honeycomb reactor or reactor component is disclosed, including the steps of providing a honeycomb structure having cells divided by cell walls, providing an array of cutting tools arrayed in a pattern so as to be able to simultaneously align with a first plurality of the cell walls at a first end of the structure, and cutting the walls of the first plurality, reducing their height. Systems utilizing the reactors or reactor components thus formed are also disclosed.

4 Claims, 20 Drawing Sheets

U.S. PATENT DOCUMENTS

2008/0031788 A1     2/2008    Brophy et al. ................ 422/207
2010/0135873 A1*   6/2010    Sutherland .................... 422/218
2010/0143215 A1*   6/2010    Caze et al. .................... 422/198
2012/0148457 A1*   6/2012    Sutherland et al. ........... 422/222

* cited by examiner

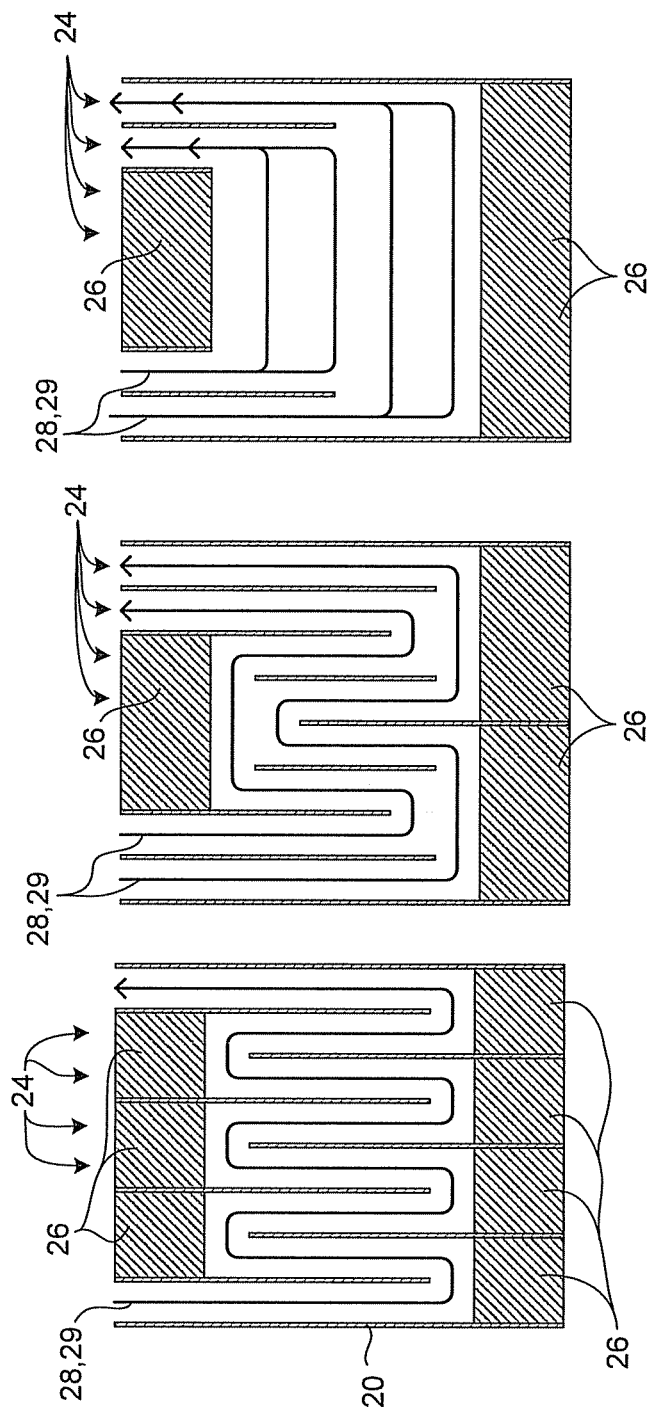

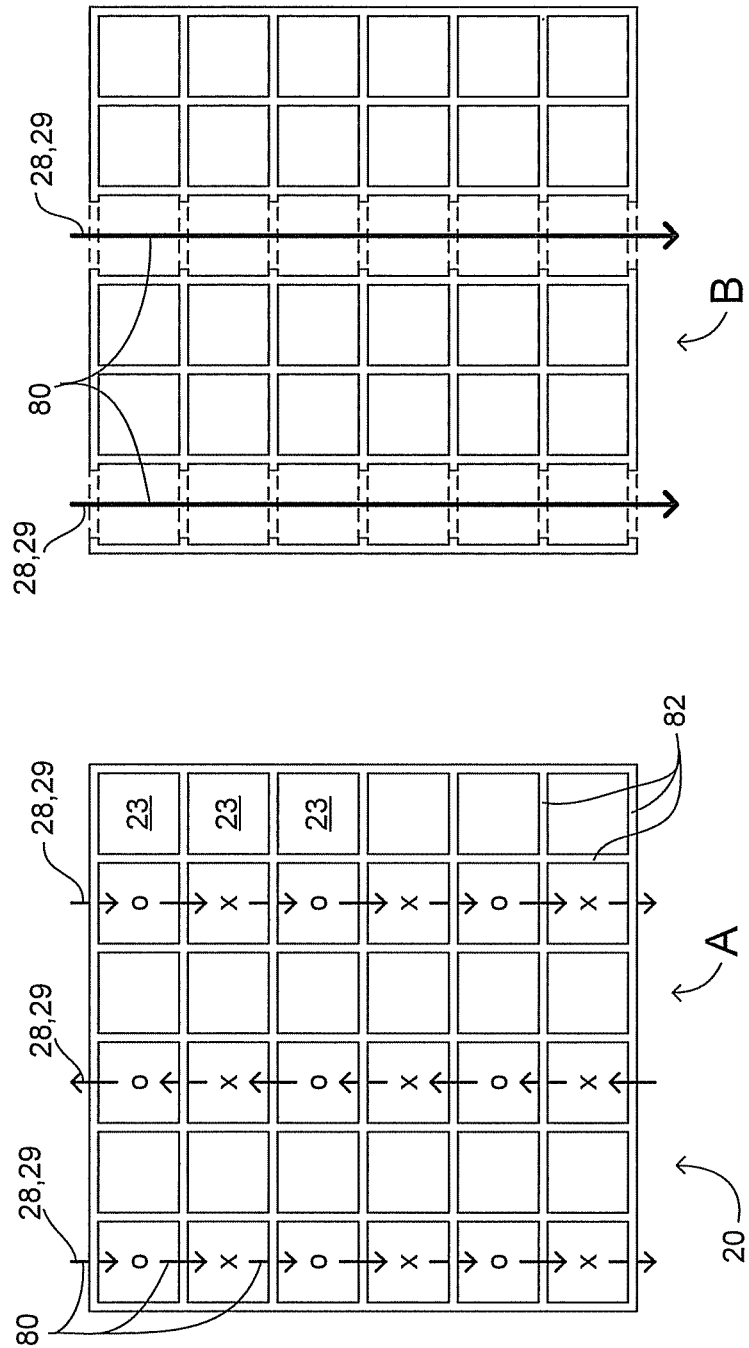

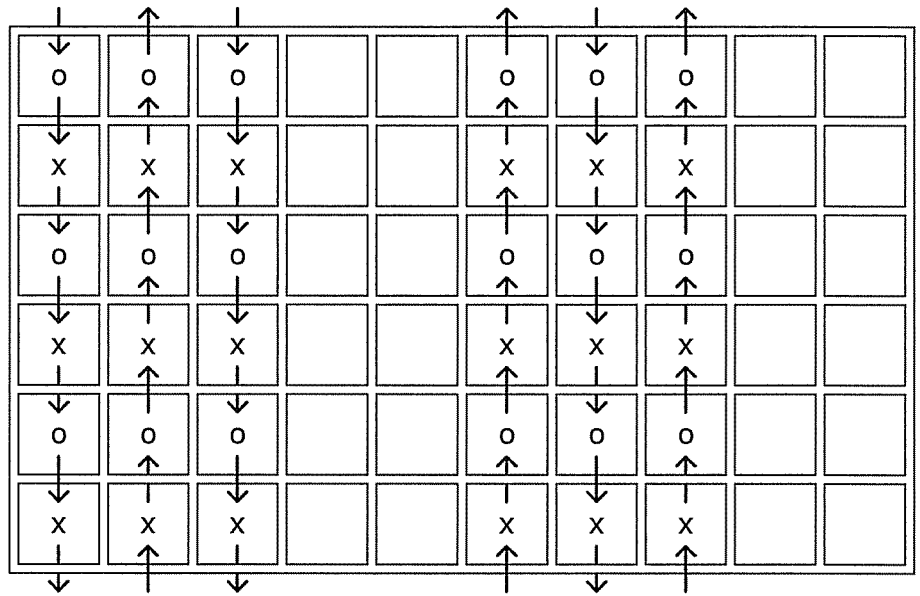
Figure 14A  $F_A$
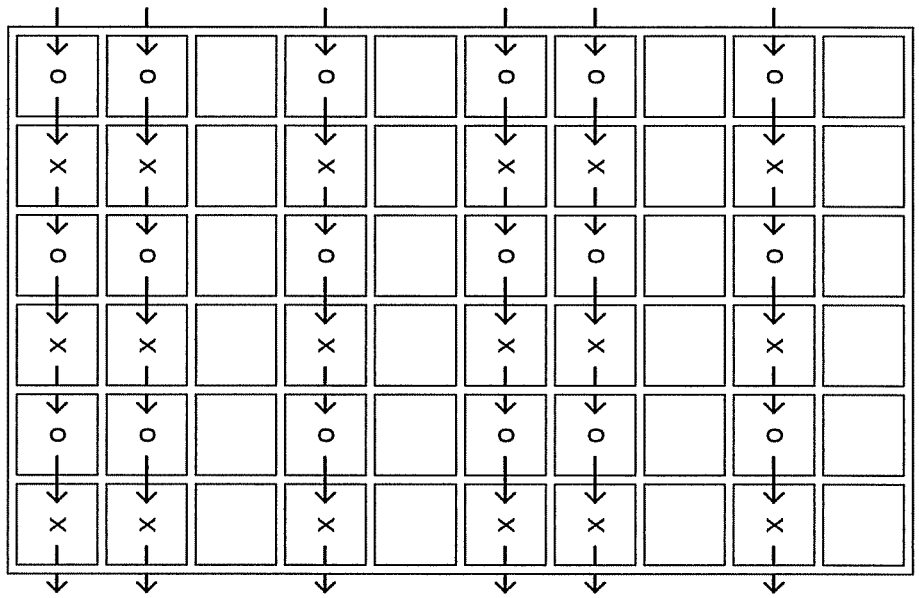
Figure 15  $G$

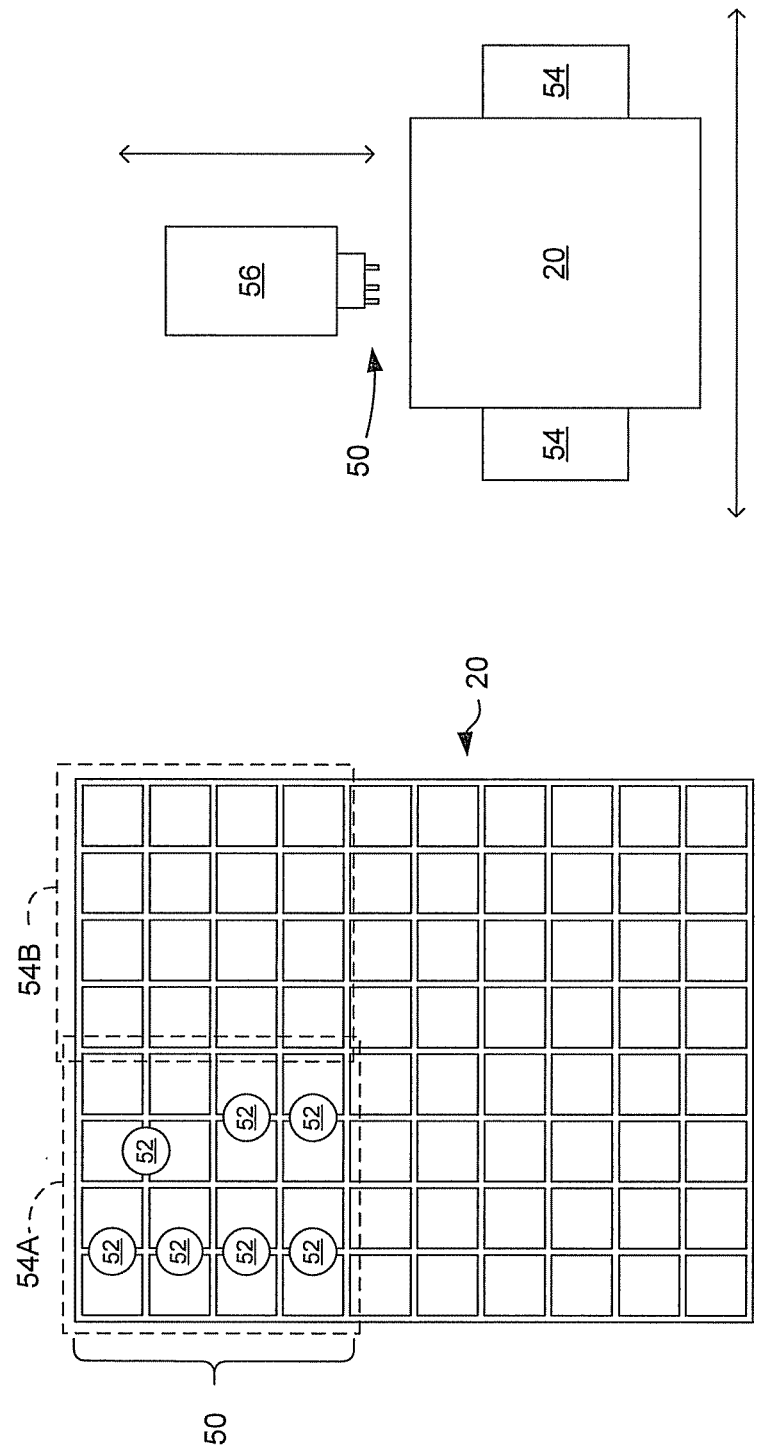

METHODS FOR FORMING HONEYCOMB MINIREACTORS AND SYSTEMS

PRIORITY

This application claims priority to U.S. Provisional Patent Application No. 61/118,625, filed Nov. 30, 2008, titled "Honeycomb Mini-Reactor Systems and Methods".

BACKGROUND

The present invention relates generally to honeycomb or extruded-body based reactors, more specifically to systems and methods for maximizing the utility and minimizing the cost of honeycomb reactors for a wide range of heat exchange and other performance requirements.

SUMMARY

According to one aspect of the present invention, a method of forming a honeycomb reactor or reactor component is disclosed, including the steps of providing a honeycomb structure having cells divided by cell walls, providing and array of cutting tools arrayed in a pattern so as to be able to simultaneously align with a first plurality of the cell walls at a first end of the structure, and cutting the walls of the first plurality with the array of cutting tools, reducing the height of the cell walls of the first plurality. Other aspects of the invention include reactors and/or systems formed of such reactors or reactor components and methods of use, including standardized reactor or reactor component systems, and standardized reactor or reactor component engineering or design.

BRIEF DESCRIPTION OF THE DRAWINGS

FIGS. 3, 4, and 4A are is a cross-sectional views of cells closed on one or both ends of a honeycomb body, showing various methods useful in the context of the present invention for interconnection between cells.

FIGS. 9, 10, 11, 12, 13, 14, 14A, 15, 16, 17, 18, 19, 20, 21, 22, 23, 24, 25, 26, 27, 28, 29, and 30 are semi-schematic plan view diagrams of path patterns, taken in a plane perpendicular to the common cell direction, including repeating path-units, useful in the context of the present invention.

FIG. 33 is a semi-schematic plan view of an array of cutting tools useful for manufacturing reactors or reactor components according to one aspect of the present invention.

FIG. 34 is a diagrammatic side elevation view of an apparatus for manufacturing reactors or reactor components according to another aspect of the present invention.

DETAILED DESCRIPTION

Figure 2:
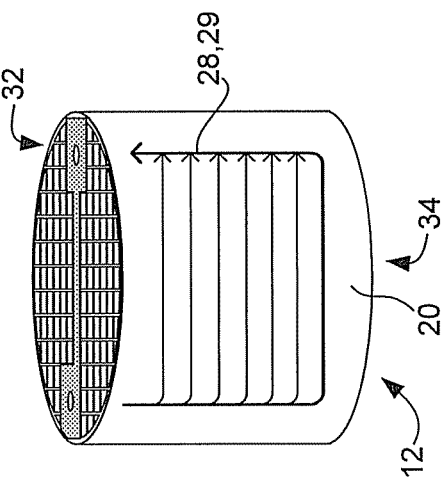
FIGS. 2 and 2A are side elevation views of the reactor or reactor component of FIG. 1, showing path details in a plane parallel to the common direction of the cells, of the fluid passage of FIG. 1 according to two different embodiments thereof.
Figure 1:
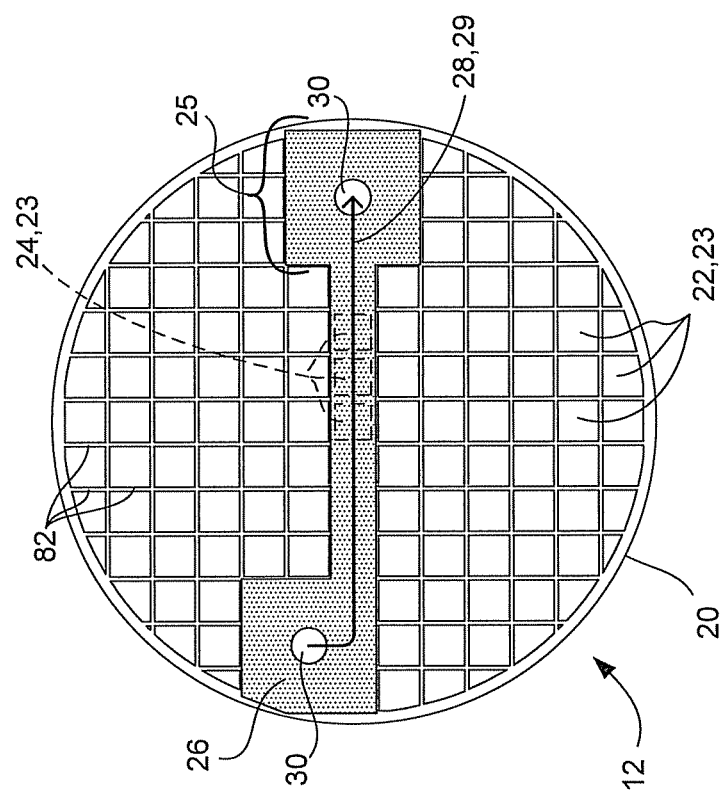
FIG. 1 is a plan view of reactor or reactor component comprising a honeycomb body showing a path of a fluid passage, taken in a plane perpendicular to the common direction of the cells.

FIG. 1 shows a plan view of a type of reactor or reactor component 12 with which the present invention is concerned. FIG. 2 shows a perspective view of the reactor or reactor component 12, and FIG. 2A shows perspective view of an alternative embodiment.

The reactor or reactor component 12 comprises a honeycomb body 20. The body 20 has cells 23 extending in parallel in a common direction from a first end 32 of the body to a second end 34, with the cells 23 seen end-on in FIG. 1, divided by walls 82. The cells 23 include a first plurality of cells 22 open at both ends of the body and a second plurality of cells 24 closed at one or both ends of the body, such as, in this example, by one or more plugs 26 or by a more or less continuous plugging material 26 disposed at or near the end of the body and optionally partly within the cells of the second plurality of cells 24. The second plurality of cells 24 (the closed cells) contain a passage 28 extending through the body 20 across the cells 24. The passage 28 may follow a serpentine path 29 up and down along the common direction of the cells 23, in the general direction shown in FIG. 2, extending laterally perpendicular to the cells 23 only at or near the ends 32, 34 of the body 20, where walls between the cells 24 are shortened to allow fluid communication between the cells 24.

Figure 2A:
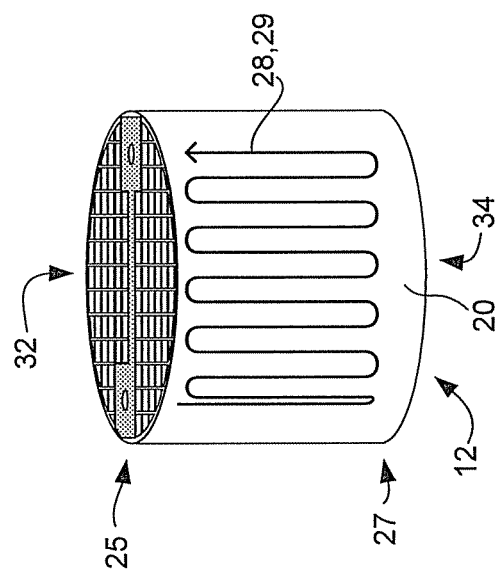

In an alternative embodiment of the passage 28 or path 29, the passage need not follow a serpentine path back and forth along the common direction, but follows instead a wide, parallel path across the cells 24 whose walls have been removed completely or in major part, as suggested by the path 29 of FIG. 2A. Further variations may be used, such as passage paths having lower-frequency serpentines, for example. Example cross-sections of such embodiments are given in FIGS. 3 and 4. If the passage 28 or path 29 is serpentine in the direction shown in FIG. 2, the passage 28 or path 29 may follow a single cell up and down in the common direction along the cells 24, as shown in FIG. 3. Alternatively, the passage 28 or path 29 may follow multiple successive respective groups of two or more cells in parallel, in the common direction along the cells 24, as shown in FIG. 4, resulting in a lower frequency serpentine path 29. FIG. 4A shows an embodiment in which several walls have been removed in major part, resulting in the passage 28 following a wide parallel path 29 across the cells 24, corresponding to FIG. 2A.

Figure 5:
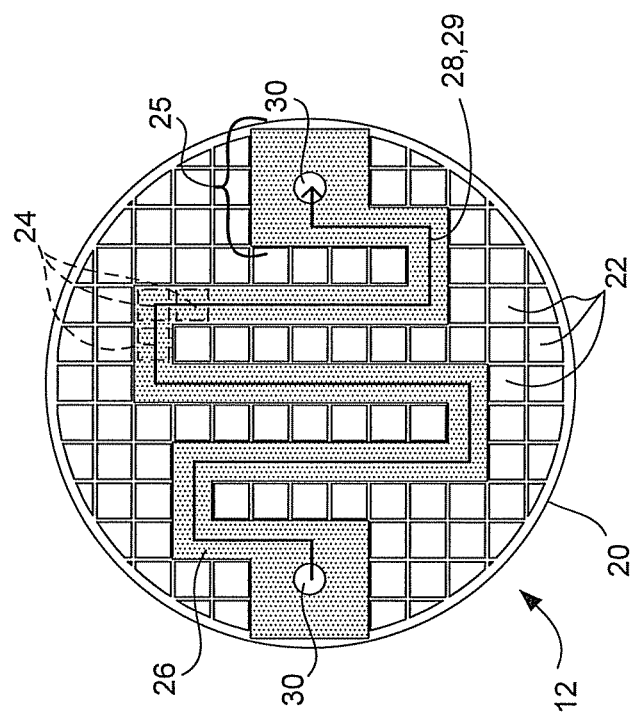
FIG. 5 is a plan view of reactor or reactor component comprising a honeycomb body showing an alternative path of a fluid passage, taken in the plane perpendicular to the common direction of the cells, with end-face access to the fluid passage.

The passage 28 or path 29 may also be serpentine in the plane perpendicular to the cells, as shown in the plan view of FIG. 5. The plurality of closed cells 24 in the plan view of FIG. 5 is arranged in a generally serpentine path 29 in the plane perpendicular to the common direction of the cells 23. The fluid passage 28 may thus be serpentine at a relatively higher frequency in the direction in and out of the plane of FIG. 5, and at a relatively lower frequency within the plane of the figure, or in cases like that of FIGS. 2A and 4A, at the relatively lower frequency only.

Figure 6:
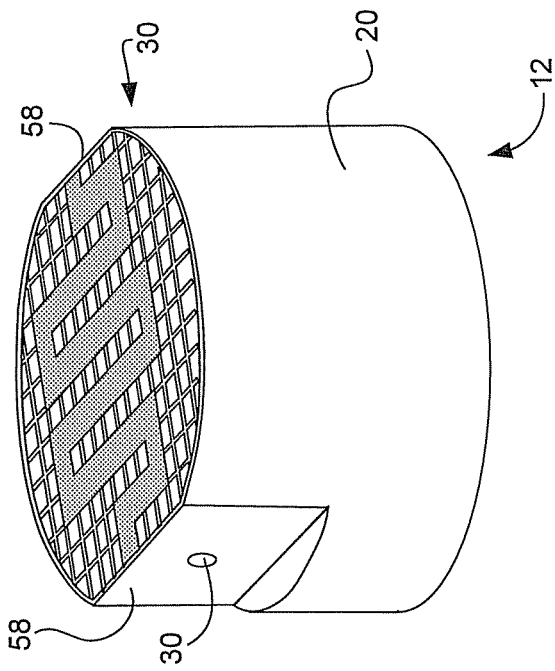
FIG. 6 is a perspective view of a reactor or reactor component having a fluid passage path, in the plane perpendicular to the cells, similar to the reactor of FIG. 5, but with side access to the passage.

Additional cells of cells 24, in a grouping 25 of more than one cell in width, if desired, may be plugged around the entry and exit ports 30 of the passage 28, as shown in FIGS. 1 and 5. These additional plugged cells can provide support for an O-ring seal or a fired-frit seal or other sealing system for providing a fluidic connection to the passage 28. Alternatively, as shown in FIG. 6, side walls 58 may be provided on the body 20, with ports 30 therein through which to access the passage 28.

The extruded body or honeycomb 20 may be any appropriate material but is most desirably formed of an extruded glass, glass-ceramic, or ceramic material for durability and chemical inertness. Alumina ceramic is generally preferred as having good strength, good inertness, and higher thermal conductivity than glass and some ceramics. Greater detail concerning general materials and fabrication procedures developed by the present inventor and/or colleagues of the present inventor may be found in PCT Publication No. WO 2008/121390, assigned to the present assignee.

Figure 8:
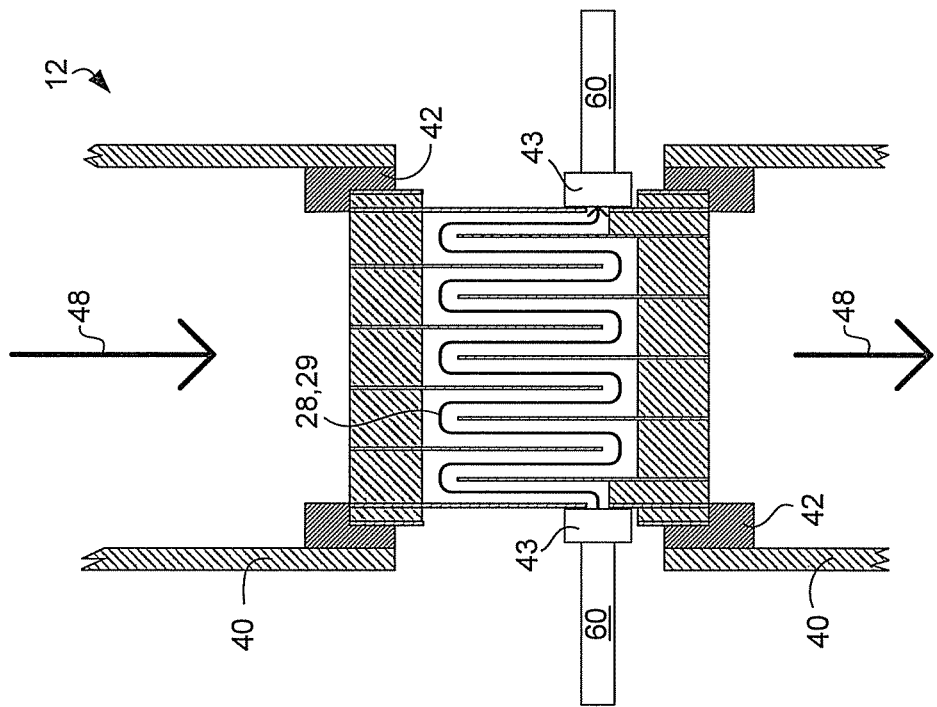
FIG. 8 is a cross-sectional view of a reactor or reactor component showing fluid connections to side faces of the extruded body.
Figure 7:
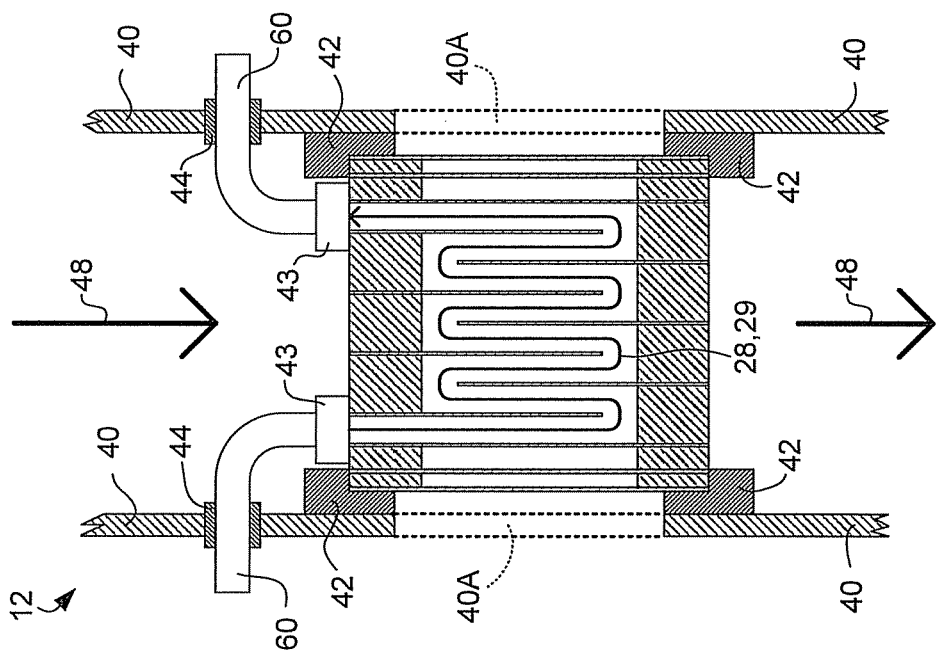
FIG. 7 is a cross-sectional view of a reactor or reactor component showing an instance of fluid connections to the end face of the extruded body.

FIGS. 7 and 8 are cross-sectional views of a fluidically connected reactor or reactor component 12 showing sample connections useful for end ports and side ports on the body 20, respectively. In the embodiment of FIG. 7, a fluid housing 40 supports the extruded body via seals 42. The housing 40 may comprise a single unit enclosing the extruded body, or the portions 40A may optionally be excluded. A passage 48 is formed through the open cells 22 shown in FIGS. 1 and 5, in cooperation with the housing 40. Passage 28 in the body 20 is accessed via conduits 60 through seals 43. Still other seals 42 seal openings in the housing 40 through which conduits 60 pass.

FIG. 8 is similar to FIG. 7, but less seals are required, and no seal is needed directly between the two passages 28, 48. Seal materials may thus be optimized independently for the materials to be flowed in each path, and seal failures will not result in materials from the two passages 28, 48 intermixing. In either FIG. 7 or FIG. 8, or in other embodiments discussed herein, the passage 28 and/or the passage 48 may be provided with catalyst embedded in the extruded body 20 or coated within the respective passage or within the cells of the respective passage, as desired.

Variation in Passage Paths: Straight Path Patterns

FIG. 5 shows a simple serpentine path 29 of the passage 28 that covers most of the first end 32 of the body 20. This serpentine pattern path 29 positions a long passage 28 beside a short passage in the fowl of cells 22, and repeats this layout configuration across the entire honeycomb body 20. The particular path 29 of FIG. 5 is just one of a class of serpentine paths that may be implemented to provide a long passage 28 through the honeycomb body 20.

The following sections will explore other types of paths 29 for the passage 28 or for multiple such passages in the same body 20, when the paths 29 are each taken or considered, as in FIG. 5, in a plane perpendicular to the common direction of the cells 23 of the body 20. It is understood that the actual passage 28 having a given path 29, when the path is taken or considered in the perpendicular plane, may be tightly serpentine in the direction along the common direction of the cells 23, as in FIG. 3, more loosely serpentine as in FIG. 4, or straight (not serpentine at all in the common direction) as in FIG. 4A, or of some other configuration.

For each pattern or a path type shown, a plan-view semi-schematic diagram will be presented that represents one or more sub-path unit patterns that repeat across the end of honeycomb body such as the first end 32 of the body 20 as in FIG. 5. FIGS. 9 and 10 are the first of such plan-view, semi-schematic diagrams, of path types A and B respectively. Each subsequent additional path type is likewise labeled with a letter for ease of reference.

Referring to FIGS. 9 and 10, showing path types A and B, respectively, a portion of a first end of a body 20 is represented, with cells 23, separated by walls 82, extending in a common direction within the body 20, into the plane of the figure. Arrows 80 show the path 29 of the passage 28 and depict the direction of fluid flow.

In FIG. 9, foreground ones of arrows 80 correspond to locations where walls at the first end of the body 20 are reduced in height to form U-bend turns, while background ones of arrows 80 correspond to location where walls at the second end of the body are reduced in height to form U-bend turns. An "x" in a cell represents fluid flow downward into the plane of the figure, while an "o" represents fluid flow upward out of the plane of the figure.

The entire diagram pattern A shown in FIG. 9 can be a single sub-path unit pattern that is repeated across an end of a honeycomb body 20. One path that may be formed by such repetition, along with appropriate edge paths, is the serpentine type path of FIG. 5. Of course it is understood that additional paths not shown are used near the perimeter of a honeycomb body 20 to link path or paths 29 together into one or more larger paths, or to provide access to the passages 28, or both, in order to form one or more continuous passages 28 through the honeycomb body 20. Also, in all the diagrams except for FIGS. 10 and 11, simple up and down passages 28 are shown, like that of FIG. 3. The passage configurations of FIGS. 10 and 11 (explained below), as well as others, can also be employed with the various patterns shown herein (e.g. three parallel cells up and three parallel cells down).

In FIG. 10 showing path type B, the entire shown portion of the path or paths 29 of the passage or passages 28 is represented, by a pair of foreground arrows 80. This corresponds to an embodiment like that of FIG. 4A in which the passage 28 is not serpentine back and forth along the common direction of the cells 23, but merely runs directly across the particular cells.

Figure 11:
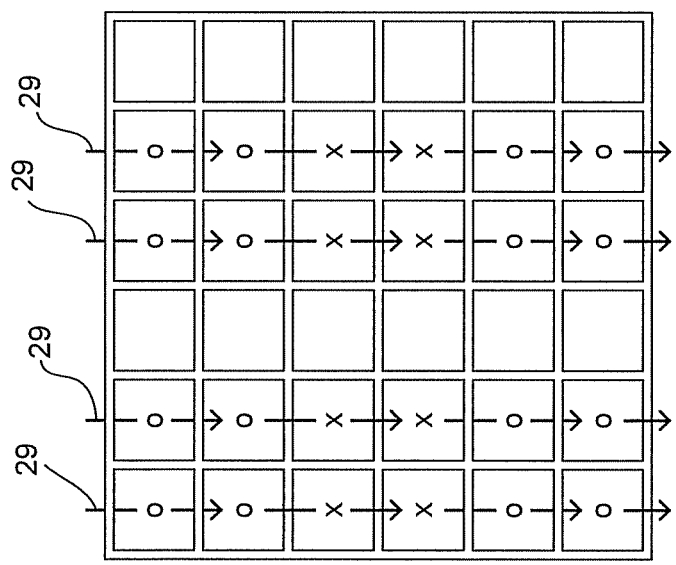

In FIG. 11, in the direction along the path or paths 29, two background arrows 80 in a row are followed by two foreground arrows 80, as two cells with "o" markings are followed by two with "x" markings, indicating a serpentine passage along the common direction of the cells 23 like the passage 28 shown in FIG. 4.

In both path patterns A and B, because the cells of each path are arranged side-by-side across the end of the body 20 these patterns are referred to as "Straight" patterns, even though they may make up part of a serpentine path in a plane perpendicular to the common direction of the cell, as in FIG. 5.

Figure 12:
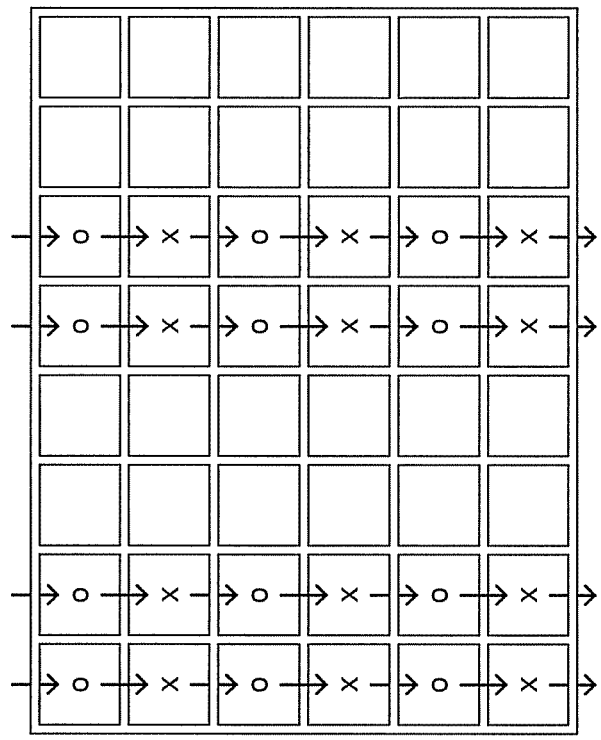
Figure 13:
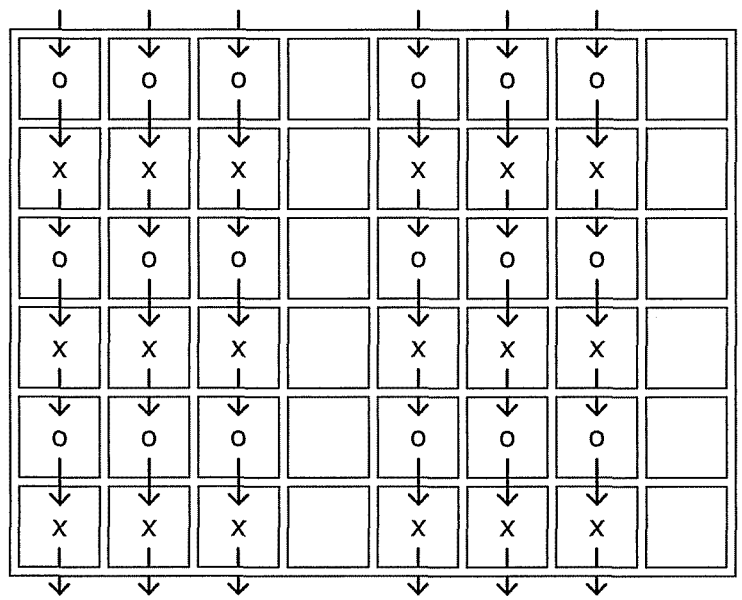
Figure 14:
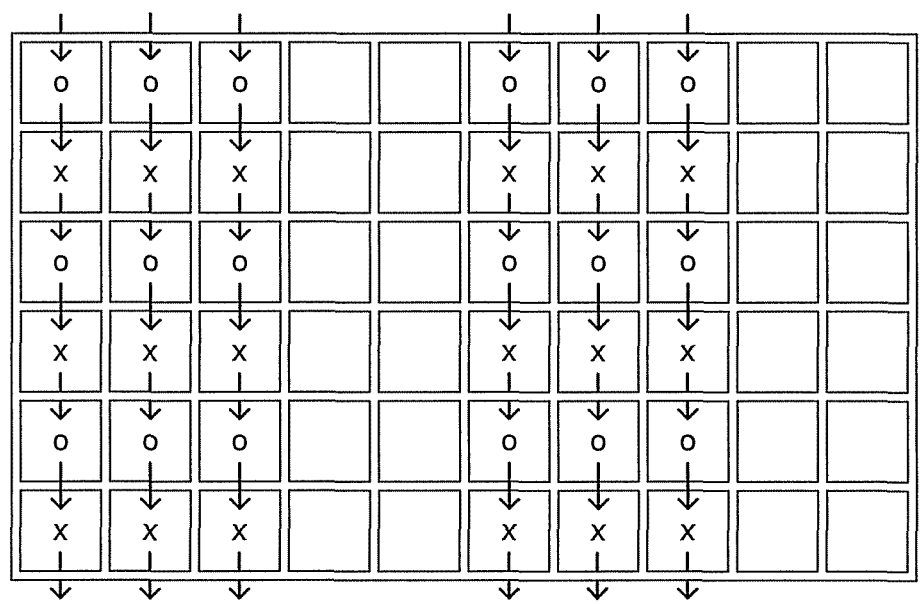

A nomenclature has been developed to categorize various path types and differentiate the straight patterns of path types A and B from more complex patterns presented later. The format is "Straight R-H" where "R" is the number of reactant cell columns and "H" is the number of heat exchange cell columns FIGS. 9 and 10 depict two straight configurations, Straight 1-1 (Pattern A) and Straight 1-2 (Pattern B). Still other straight path configurations have double-width reactant cell path configurations (patterns C and D of FIGS. 11 and 12 and triple-width reactant cell path configurations (patterns E and F of FIGS. 13 and 14, respectively).

While these figures show co-directional flow in parallel reactant fluid cells, counter-directional flow configurations are also assumed, as shown in pattern $F_A$ of FIG. 14A for the Straight 3-1 configuration.

The pattern of alternation of straight reactant and heat exchange cell paths can modified by integrating two or more patterns into a larger pattern, as shown in FIG. 15, where pattern G is a Straight 2-1-1-1 pattern.

Serpentine Path Patterns

Figure 16:
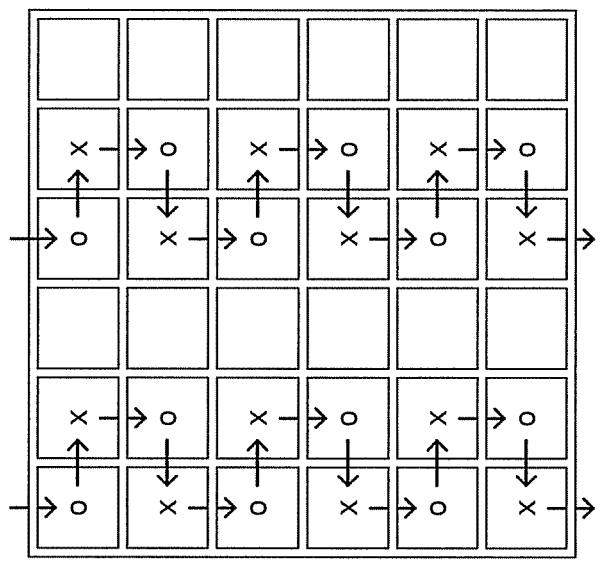

Reactant channels can be arranged in non-straight configurations by introducing turns along the flow path. An example is shown in FIG. 16, where the reactant cell bend path follows a simple serpentine in parallel to a set of open, typically heat exchange cells. This serpentine path is referred to as a 1×1 path because the bend extends one cell in the left-right direction, performs a 90 degree turn, extends one cell in the downward direction, and then performs another 90 degree turn. A nomenclature has been developed to categorize various serpentine layout patterns. The format is: Serpentine X-Y-H-S where X is the number of left-right direction cells the serpentine follows before turning, Y is the number of downward direction cells the serpentine follows before turning, H is the number of heat exchange channel columns and S is the number of cells the next reactant channel serpentine to the right is shifted downward relative to current reactant channel serpentine. (If S is zero then this value may be omitted.)

Figure 17:
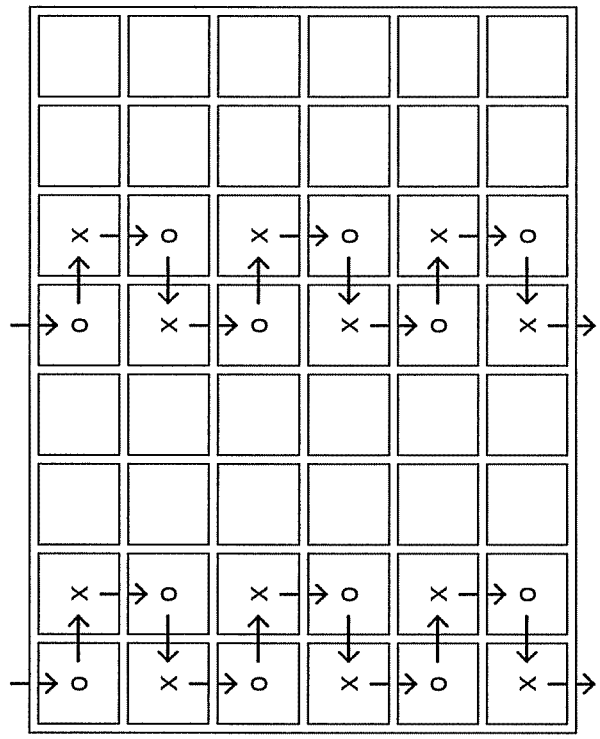

Therefore FIGS. 16 and 17 presents two serpentine reactant channel paths (patterns H and I) denoted as Serpentine 1-1-1 and Serpentine 1-1-2.

Figure 18:
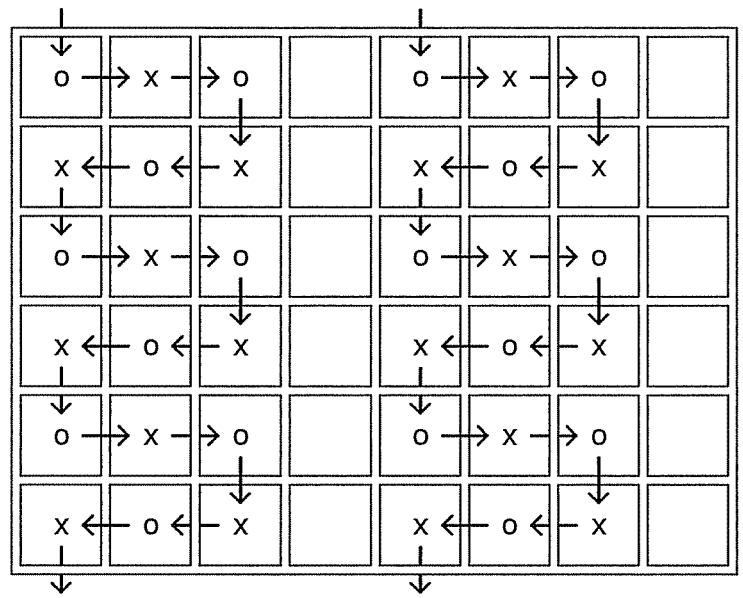
Figure 19:
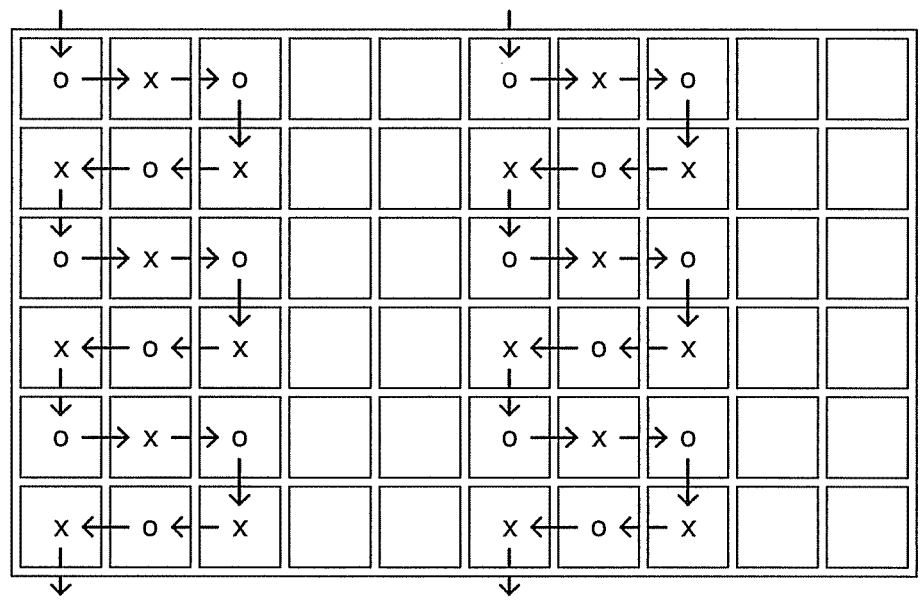

By adjusting the values of parameters X and Y it is possible to generate different serpentine channel paths. For example, if X=2 and Y=1 patterns J and K shown in FIGS. 18 and 19 can be created. A potential issue with the serpentine patterns of FIGS. 18 and 19 is that one third of the typically reactant channels are not adjacent to a typically heat exchange channel.

Figure 21:
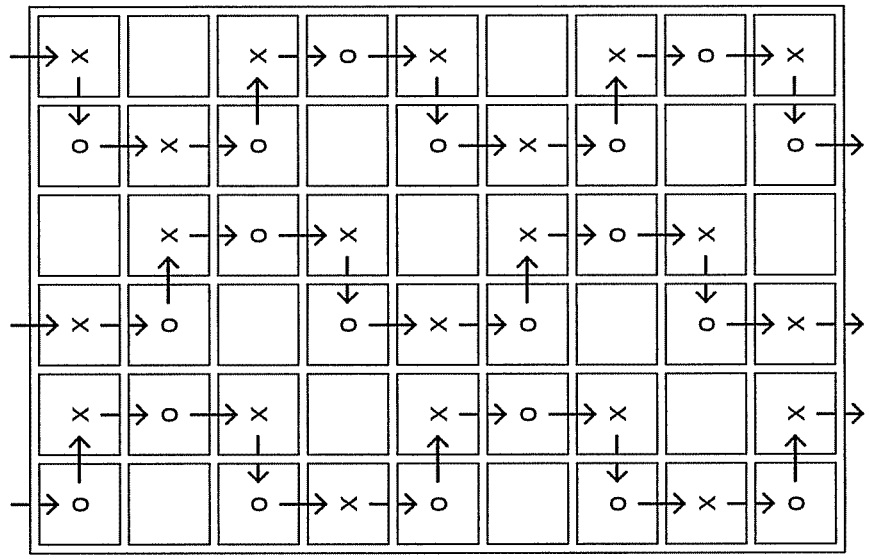
Figure 20:
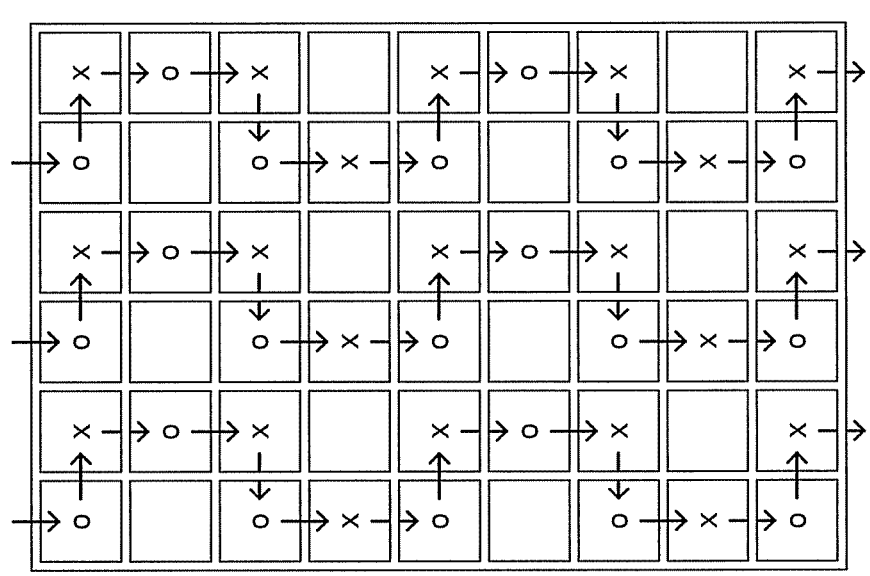

The problem of poor reactant channel proximity to nearby heat exchange channels can be remedied by increasing the serpentine path Y parameter. For example, if X=1 and Y=2 paths L and M shown in FIGS. 20 and 21 may be created. These patterns ensure that each reactant channel path shares at least one wall with a nearby heat exchange channel. These patterns accomplish this while increasing the reactant channel utilization fraction to 0.75.

Figure 23:
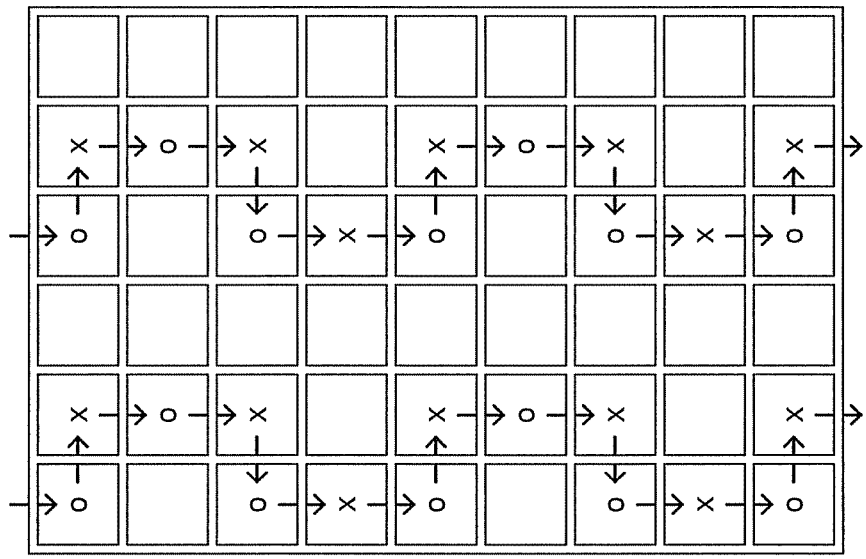
Figure 22:
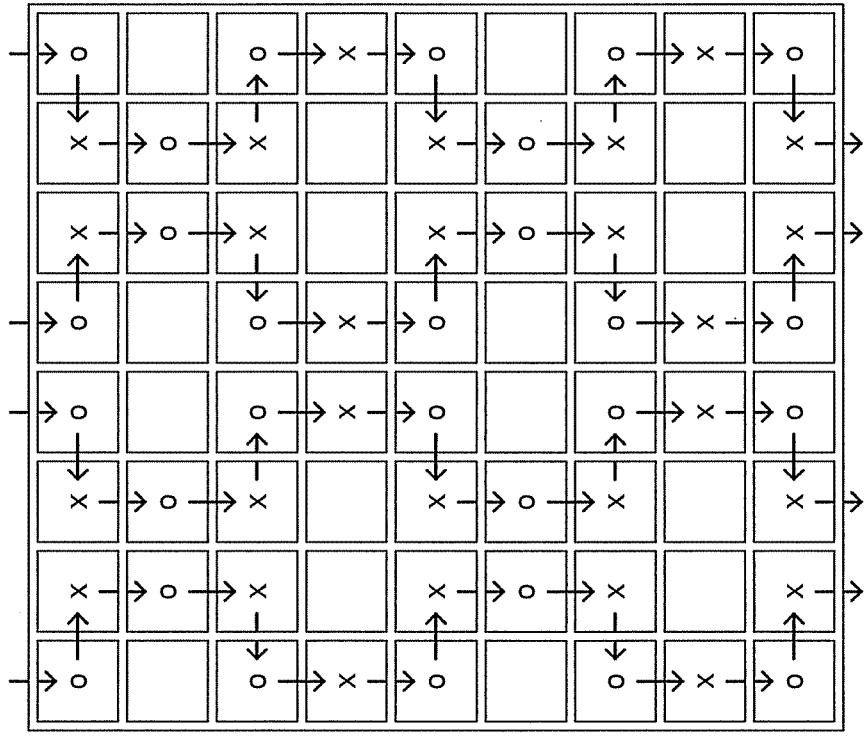

Other serpentine channel patterns can be created by changing the serpentine path H and S parameters. FIGS. 22 and 23 show serpentine path N where S=2 and serpentine path O where H=1. Both these configurations alter the proximity of reactant channels to heat exchange channels, providing different additional points in the design tradeoff between local heat exchange performance and reactant channel utilization fraction.

Figure 25:
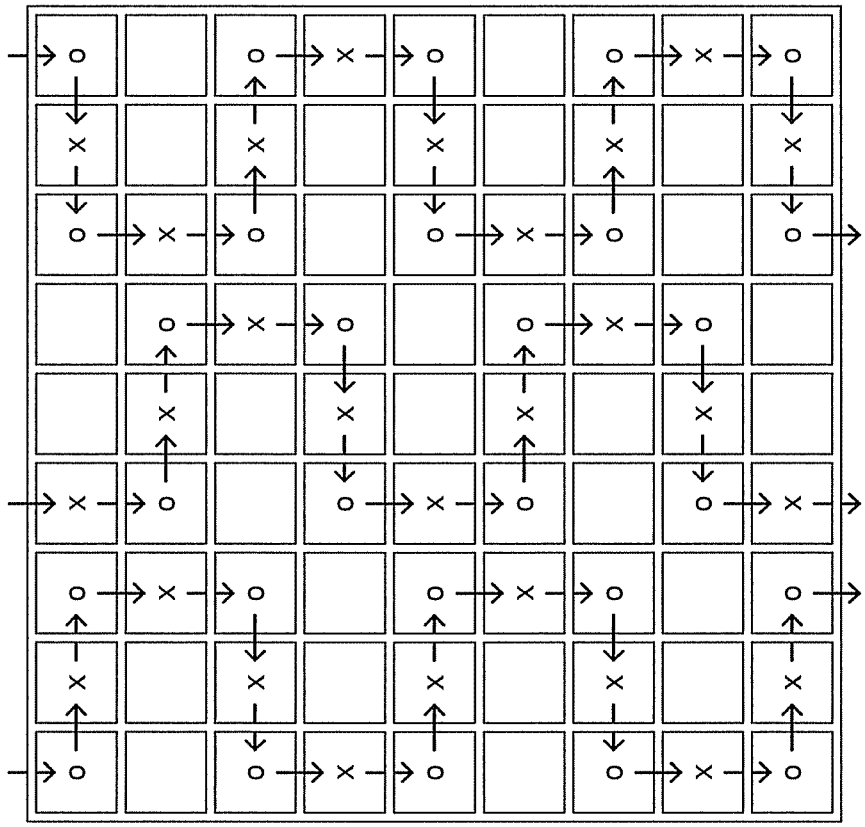
Figure 24:
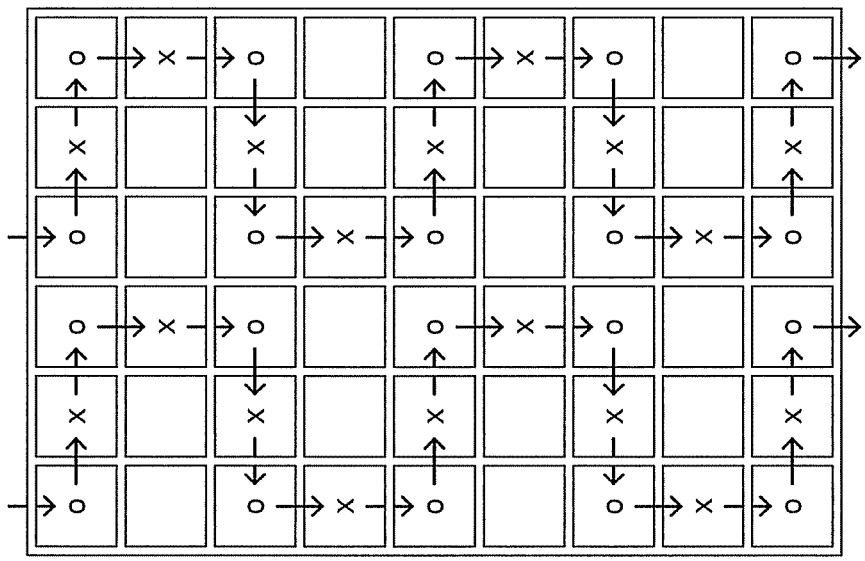
Figure 27:
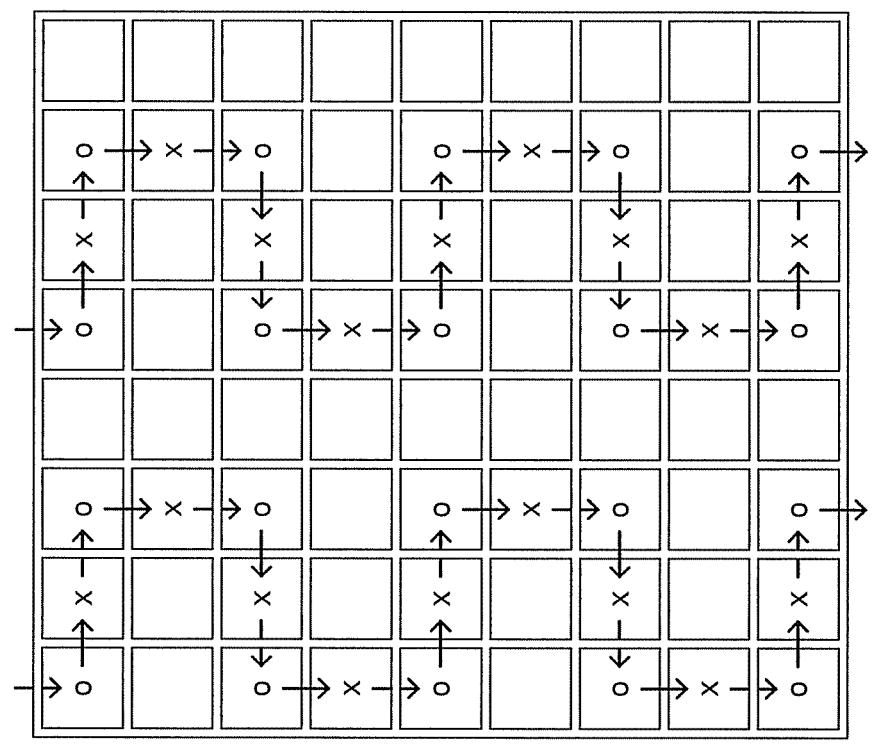
Figure 26:
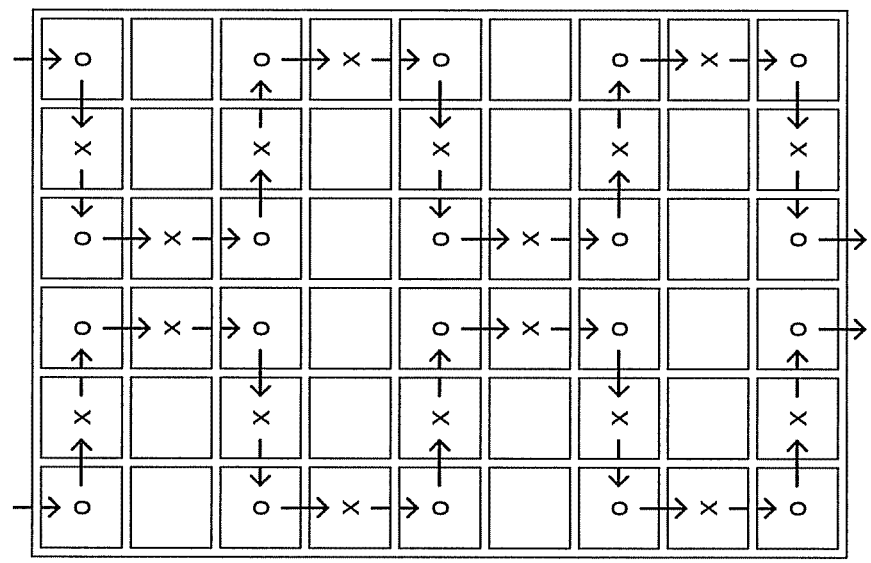

Other serpentine channel patterns, patterns P, Q, R, and S can be generated by setting X=2 and Y=2, as shown in FIGS. 24-26. These patterns generally improve heat exchange performance over the X=1, Y=2 configurations presented in FIGS. 20-23, but at the expense of reduced reactant channel utilization when compared to their X=1, Y=2 counterparts.

Irregular Path Patterns

Channel patterns can be created that include U-turns in a more complex configuration than those presented above. These patterns are called irregular even though they can be arranged in a regular array to provide a reactant channel path that covers a large portion of the substrate end face. In general these patterns are intended for applications where high reactant channel utilization is required and heat exchange performance may be relaxed. This operating point may be desirable at certain points along the reaction passage path, such as in a region near the end of a reactor where most of the reaction has already progressed to completion but additional residence time is required. The nomenclature for organizing various irregular serpentine layout patterns is given as: "Irregular X-Y-S" where X is width of the irregular repeating pattern, Y is height of the irregular repeating pattern, and S is the number of cells the next reactant channel serpentine to the right is shifted downward relative to current reactant channel serpentine. (If equal to zero then the "Y" value may be omitted.)

Figure 28:
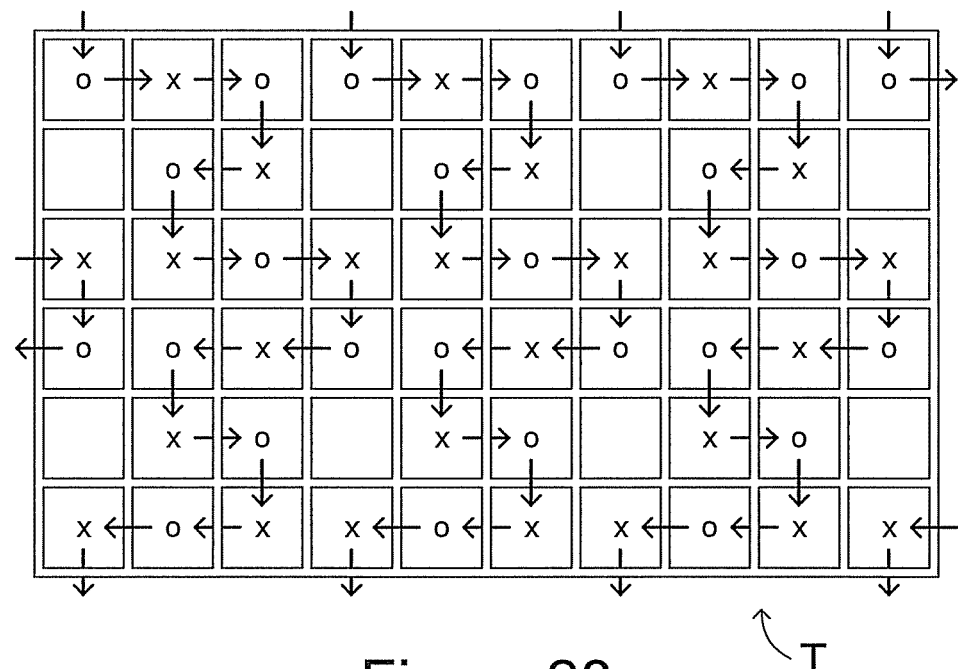
Figure 29:
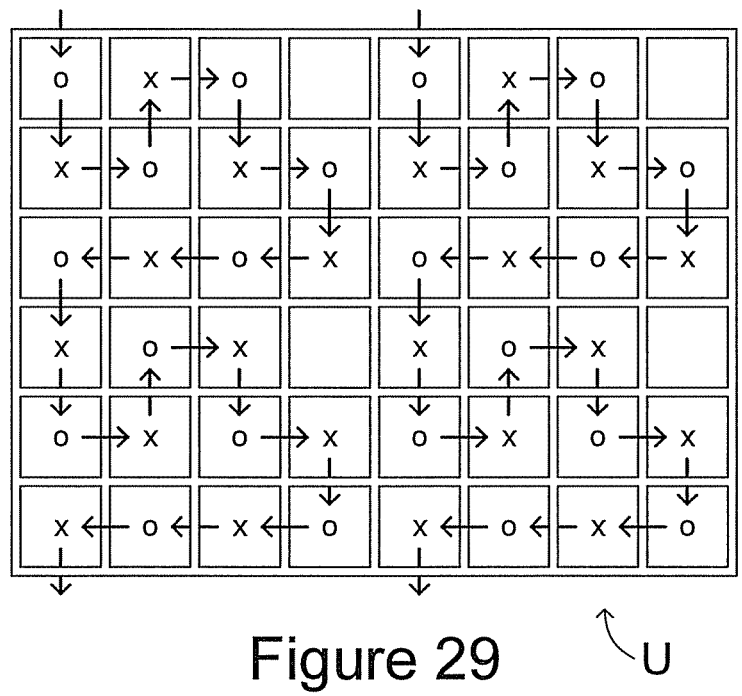
Figure 30:
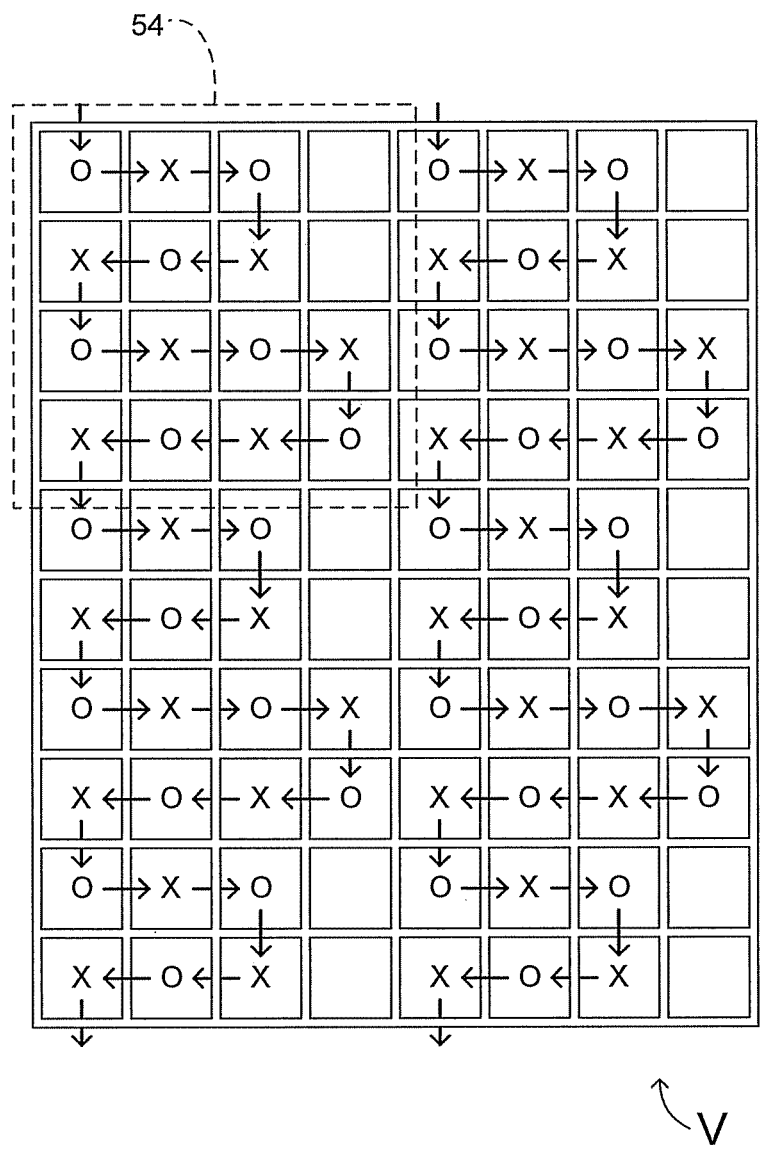

FIGS. 28 and 29 present a path pattern (Path T) that fills a 3×3 cell region with eight reactant channels and one heat exchange channel, and a second path pattern (Path U) that fills a 3×4 cell region with eleven reactant channels and one heat exchange channel. Another path pattern is shown in FIG. 30 (Path V) where a 4×4 cell region is filled with fourteen reactant cells and two heat exchange cells.

Table 1 below presents a summary of geometrical performance parameters for all reactant channel patterns presented above (Paths A-V) of FIGS. 9-30.

Moving across the table columns, the first two columns provide the pattern designation code and pattern reference letter for the particular pattern. The next five columns provide information on the following geometrical parameters relating to the unit pattern, where the unit pattern represents the minimum range of cells that can be repeated to reproduce the unit pattern across the honeycomb body end face: (1) Pattern Width: number of cell columns in the unit pattern; (2) Pattern Height: number of cell rows in the unit pattern; (3) Total Cells: total cells in the unit pattern (rows times columns for these patterns); (4) Reactant Cells: number of reactant cells in the pattern; (5) HE cells: number of heat exchange cells in the pattern. The next column provides the reactant cell utilization factor, which is the ratio of the number of reactant cells to the total number of cells in the unit pattern. The last two columns provide geometrical information on the average and maximum distance between each reactant cell in the pattern and the closest heat exchange cell, in units of cell pitch. These two parameters provide a coarse estimate of the heat exchange performance, since increased distance between reactant cells and heat exchange cells will decrease heat exchange performance. This correlation was confirmed by heat exchange performance modeling for the straight pattern configurations.

Figure 31:
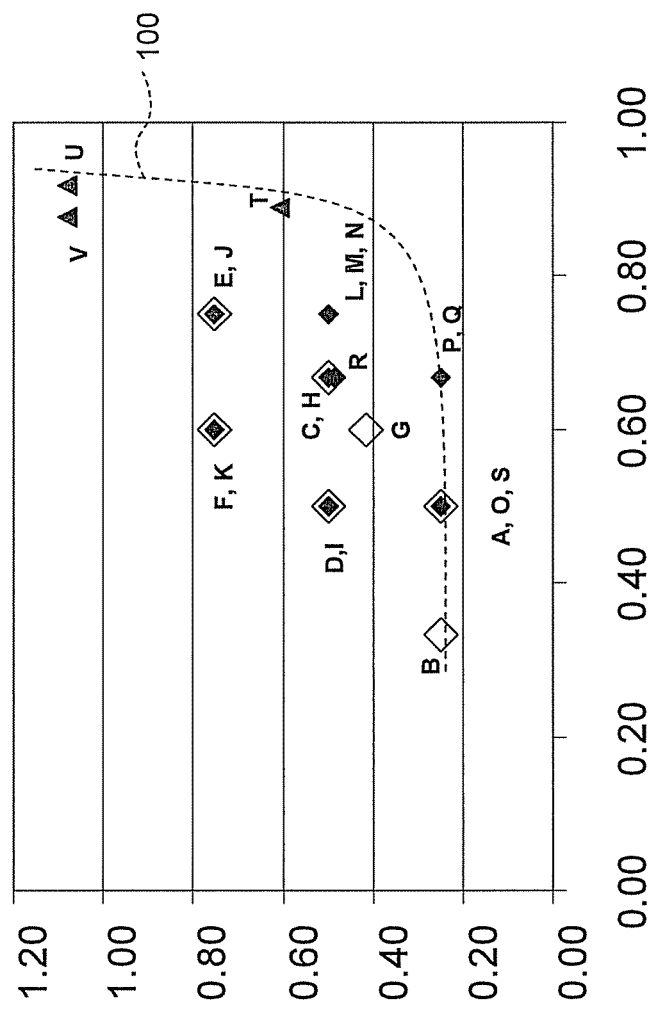
FIG. 31 is a graph comparing certain performance parameters of the patterns of FIGS. 9-30.

A graphical illustration of one performance tradeoff associated with Paths A-V is provided in FIG. 31, where calculated values of mean distance from reactant cell to heat exchange cell are plotted on the vertical axis against reactant cell utilization factor on the horizontal axis. The straight patterns are shown with open diamonds, the serpentine with smaller filled diamonds, and the irregular with triangles. The dashed black line 100 through or near the points for some of the patterns delineates a design tradeoff curve between local heat transfer performance and reactant cell utilization. Depending on local heat transfer performance requirements and reactant cell utilization requirements, a designer may select these configurations to meet target honeycomb-body reactor performance requirements. The remaining patterns appear sub-optimal in this particular tradeoff, but they may still be desirable if a particular local heat transfer performance is required for a given application independent of reactant channel utilization performance.

TABLE 1

|  | Pattern Name | Pattern Code | Pattern Width | Pattern Height | Total Cells | Reactant Cells | HE Cells | Reactant Cell Utilization Factor | Mean Distance to HE Cell | Max distance to HE Cell |
|---|---|---|---|---|---|---|---|---|---|---|
| Straight | 1-1 | A | 2 | 1 | 2 | 1 | 1 | 0.50 | 0.25 | 0.50 |
|  | 1-2 | B | 3 | 1 | 3 | 1 | 2 | 0.33 | 0.25 | 0.50 |
|  | 2-1 | C | 3 | 1 | 3 | 2 | 1 | 0.67 | 0.50 | 1.00 |
|  | 2-2 | D | 4 | 1 | 4 | 2 | 2 | 0.50 | 0.50 | 1.00 |
|  | 3-1 | E | 4 | 1 | 4 | 3 | 1 | 0.75 | 0.75 | 1.50 |
|  | 3-2 | F | 5 | 1 | 5 | 3 | 2 | 0.60 | 0.75 | 1.50 |
|  | 2-1-1-1 | G | 5 | 1 | 5 | 3 | 2 | 0.60 | 0.42 | 1.00 |
| Serpentine | 1-1-1 | H | 3 | 2 | 6 | 4 | 2 | 0.67 | 0.50 | 1.00 |
|  | 1-1-2 | I | 4 | 2 | 8 | 4 | 4 | 0.50 | 0.50 | 1.00 |
|  | 2-1-1 | J | 4 | 2 | 8 | 6 | 2 | 0.75 | 0.75 | 1.50 |
|  | 2-1-2 | K | 5 | 2 | 10 | 6 | 4 | 0.60 | 0.75 | 1.50 |
|  | 1-2-0-0 | L | 2 | 2 | 4 | 3 | 1 | 0.75 | 0.50 | 0.71 |
|  | 1-2-0-1 | M | 4 | 2 | 8 | 6 | 2 | 0.75 | 0.50 | 0.71 |
|  | 1-2-0-2 | N | 4 | 2 | 8 | 6 | 2 | 0.75 | 0.50 | 1.00 |
|  | 1-2-1-0 | O | 3 | 2 | 6 | 3 | 3 | 0.50 | 0.25 | 0.50 |
|  | 2-2-0-0 | P | 3 | 2 | 6 | 4 | 2 | 0.67 | 0.25 | 0.50 |
|  | 2-2-0-1 | Q | 6 | 2 | 12 | 8 | 4 | 0.67 | 0.25 | 0.75 |
|  | 2-2-0-2 | R | 6 | 2 | 12 | 8 | 4 | 0.67 | 0.49 | 1.00 |
|  | 2-2-1-0 | S | 4 | 2 | 8 | 4 | 4 | 0.50 | 0.25 | 0.50 |
| Irregular | 3-3-0 | T | 3 | 3 | 9 | 8 | 1 | 0.89 | 0.61 | 1.41 |
|  | 4-3-0 | U | 4 | 3 | 12 | 11 | 1 | 0.92 | 1.08 | 2.24 |
|  | 4-3-2 | V | 4 | 4 | 16 | 14 | 2 | 0.88 | 1.08 | 1.50 |

A graphical illustration of one performance tradeoff associated with Paths A-V is provided in FIG. 31, where calculated values of mean distance from reactant cell to heat exchange cell are plotted on the vertical axis against reactant cell utilization factor on the horizontal axis. The straight patterns are shown with open diamonds, the serpentine with smaller filled diamonds, and the irregular with triangles. The dashed black line 100 through or near the points for some of the patterns delineates a design tradeoff curve between local heat transfer performance and reactant cell utilization. Depending on local heat transfer performance requirements and reactant cell utilization requirements, a designer may select these configurations to meet target honeycomb-body reactor performance requirements. The remaining patterns appear sub-optimal in this particular tradeoff, but they may still be desirable if a particular local heat transfer performance is required for a given application independent of reactant channel utilization performance.

Figure 32:
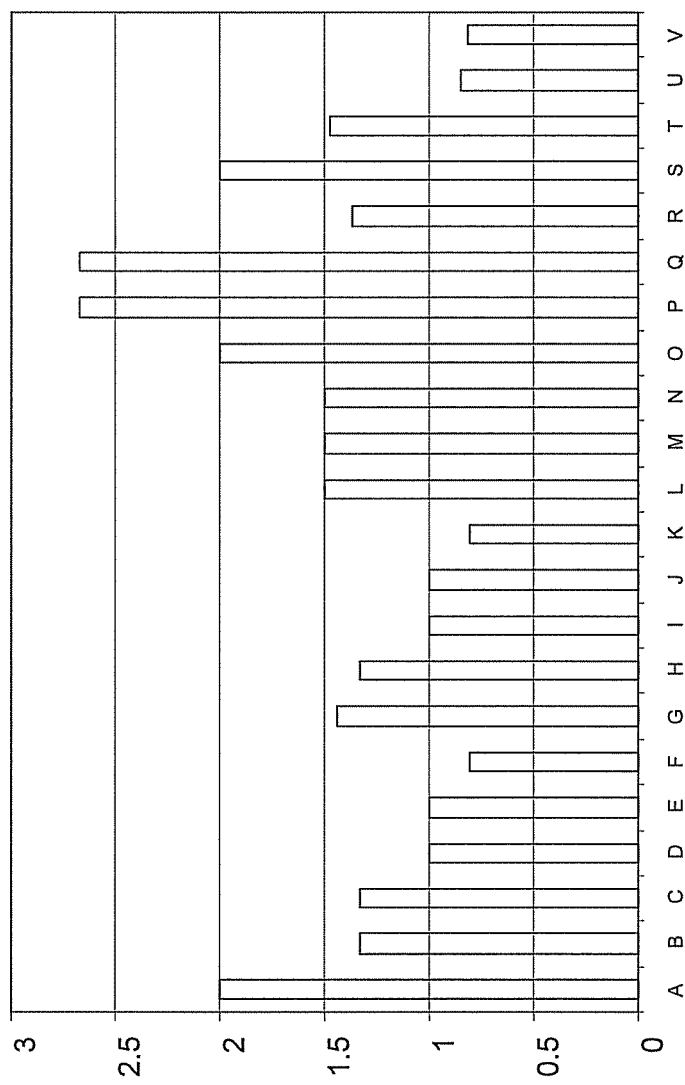
FIG. 32 is a graph comparing a certain performance metric of the patterns of FIGS. 9-30.

Patterns may also be compared using as a metric the ratio of reactant channel utilization to mean heat exchange channel distance. Results are plotted in FIG. 32 for the patterns A-V. The plot of FIG. 32 highlights the merits of the simple straight reactant pattern (Path A) as well as more complex serpentine layouts (Paths P, Q, O and S). This metric provides a measure of the maximum energy that may be transferred to or from fluid flowing in a reactant passage through a device with a given reactant cell pattern. It important to note that the configurations scoring highly on this metric do not necessarily provide the highest local heat transfer performance, so they may not be suitable for highly exothermic or endothermic reactions even though they maximize energy transfer for a device.

The present invention provides for a reactor or reactor component comprising a honeycomb structure having cells extending along a common direction and having one or more passages each extending across at least some of the cells, where the path or paths of the one or more passages, taken within a plane perpendicular to the common direction, includes or include a number of repeating sub-path units arranged in a two-dimensional array, with each sub-path unit including one or more turns or bends in the path. Turns herein are defined as any change of direction, whereas bends are two turns in succession in the same direction, without any intervening turns. Many of the patterns disclosed herein are patterns in which each sub-path unit includes one or more "bends," and not merely one or more "turns."

Manufacturing

The present invention discloses the use, in a honeycomb-body based reactor, of repeated unit patterns (taken in the plane perpendicular to the common direction of the cells) of cells forming part of the reactant passage or passages. One advantage realizable from this use of repeated unit patterns, and another aspect of the present invention, involves a method of making a reactor or reactor component including a honeycomb structure. A reactor having one or more passages each extending across at least some cells of a honeycomb structure can be beneficially made by providing an array of cutting tools arrayed in a pattern selected so as to able to allow the cutting tools to simultaneously align with a first plurality of cell walls at a first end of the honeycomb structure. The selected cell walls are in a corresponding or matching pattern to the array, the cell wall pattern having an area less than one-half of a total area of the first end of the structure. The array of tools is then aligned with and used to cut the first plurality of cell walls, reducing their height, then the array of cutting tools may be aligned with and used to cut a second plurality of cell walls to reduce their height. This step-and-repeat cutting process may be repeated as many times as needed to form the lowered or cut-away cell walls required by the desired unit pattern.

This process may understood, with respect to the pattern V of FIG. 30, by reference to FIG. 33, which is a plan view of a portion of an end of an extruded body 20. An array 50 of cutting tools such as rotary plunge-cutting heads 52 is arranged so as to be able to simultaneously cut or reduce in height each wall requiring reduction or removal in given pattern unit of the selected pattern. For the instance shown in FIG. 33, the array 50 is arranged in the configuration necessary to cut the walls of the top or first end for the smallest unit pattern 54 of pattern V of FIG. 30 (the facing end in FIG. 30). The tools 52 are used in parallel, or cutting all at once, to remove the desired portion of a first plurality of cell walls, corresponding to the walls within a first unit pattern 54A, then the tools 52 are moved to another unit pattern area pattern area such as second unit pattern 54B, and a second plurality of cell walls corresponding to the pattern are cut.

Figure 35:
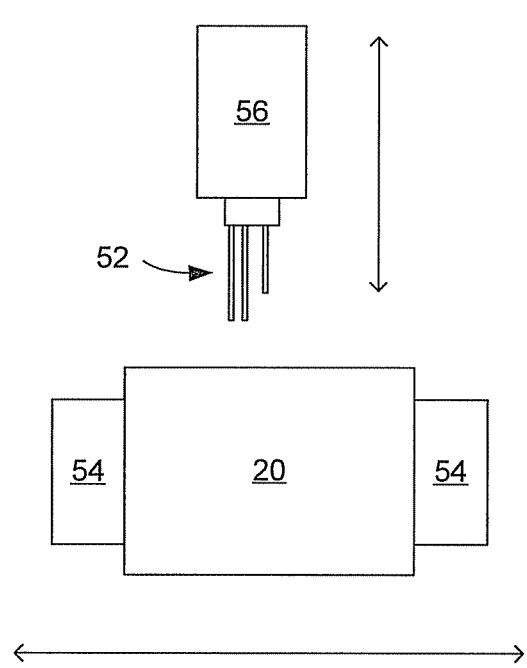
FIG. 35 is a diagrammatic side elevation view of another apparatus for manufacturing reactors or reactor components according to another aspect of the present invention.

Depending on the type of reactant passage desired, long or short reach cutting tools may be employed. This is shown in the schematic diagrams of FIGS. 34 and 35. In FIGS. 34 and 35, a holder 54 for a honeycomb structure 20 is mounted to an x-y moveable stage, not shown, allowing for the desired positioning of the structure 20 under the array 50 of cutting tools. The array 50 of cutting tools is mounted to a vertically mobile body 56, allowing the cutting heads to be brought into engagement with the selected walls of the body 20. Where relatively short lengths of wall are to be removed, short reach cutting tools may be employed, as in the diagram of FIG. 34. Relatively short lengths of wall are removed, for example, to form passages 28 like the one shown in FIG. 3. If relatively long lengths, or even complete walls, are to be removed, longer reach cutting tools may be employed, as in the diagram of FIG. 35. Relatively long lengths of wall, or even complete walls, may be removed, for example, to form passages 28 like the one shown in FIGS. 2A and 4A.

Reactors or Reactor Systems

The disclosed structures and patterns of the present invention, and other similar patterns that may be used for similar purposes, can be used to create a reactor system having interchangeable reactor or reactor-component sub-units each comprising a honeycomb structure. The honeycomb structures can be standardized around a set of one or more standard honeycomb structure shapes including one or more standard areas in the plane perpendicular to the common cell direction; one or more standard lengths; and one or more standard number of reactant passages extending across the cells of the honeycomb structure. Regardless of the level of standardization on these characteristics, any of the interchangeable reactors or reactor-components can have variable unit patterns of reactant cells in the plane perpendicular to the common cell direction. In other words, reactors or reactor components can be standardized on any or all of many other dimensions, even down to one standard size and shape, but still have variability in the ratio of reactant passage cells to thermal control passage cells, depending on the unit cell pattern. Desirably, the variation in unit cell pattern is restricted to a set of two or more standard cell patterns yielding two or more standard ratios, taken in a plane perpendicular to the common direction, of thermal control passage cells to reactant passage cells.

Figure 36:
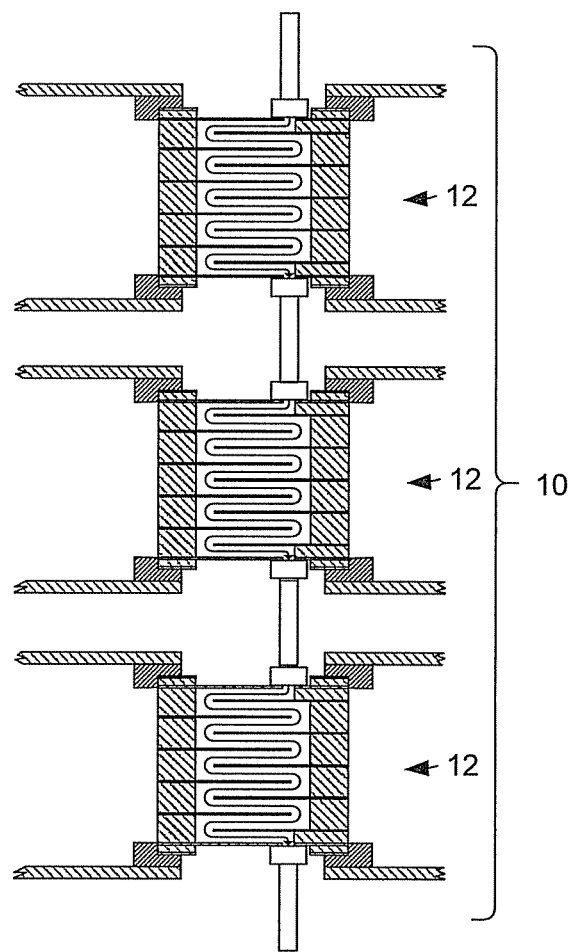
FIG. 36 is a cross section of a portion of a reactor or reactor system according to yet another aspect of the present invention.

An example of some components of such a system is shown in the cross-section of FIG. 36. A reactor or reactor system 10 is comprised of at least three reactors or reactor components 12. Each reactor component has the same size and shape and fluidic connections, but, depending upon the pattern used or selected for use within each reactor or reactor component 12, the thermal exchange performance and other performance parameters can vary from one reactor or reactor component 12 to the next. The overall performance of the reactor or reactor system 10 can thus be optimized.

Reactor or Reactor Component Engineering and Design

The present invention also offers advantages for the engineering and design of honeycomb-body based reactors or reactor components. In order to engineer or design a reactor or reactor component having a desired performance, that performance may first be specified by determining the desired properties and/or distribution of properties for the reactor or reactor component. Relevant properties may include, but are not limited to, such properties as heat transfer coefficient, pressure drop, ratio of total structure volume to total reactant passage volume, total area of open cells, distribution of open cells, and ratio of open cells to reactant passage cells.

Once the desired values of one or more of these properties, or other relevant properties, are determined, a sub-path unit pattern may be selected that matches the desired properties to within an allowable deviation, from among a pre-characterized set of sub-path unit patterns. Alternatively, the sub-path unit pattern that most closely matches the desired properties may be selected from the pre-characterized set of sub-path unit patterns.

What is claimed is:

1. Method of making a reactor or reactor component including a honeycomb structure having cells extending along a common direction and having one or more passages each extending across at least some cells, the method comprising:
    providing a honeycomb structure having open cells extending between a first end and a second end thereof, said cells divided by cell walls;
    providing an array of cutting tools arrayed in a pattern so as to able to simultaneously align with a first plurality of said cell walls at said first end of the structure, the first plurality of cell walls arranged in a corresponding pattern having an area less than one-half of a total area of the first end of the structure;
    aligning said array with said first plurality of cell walls and cutting the walls of the first plurality of cell walls, reducing their height.

2. The method of claim 1 further comprising aligning said array with a second plurality of cell walls at said first end of the structure different from said first plurality and cutting the walls of the second plurality of cell walls, reducing their height.

3. The method of claim 2 further comprising closing a plurality of cells at one or both ends of the body, such that the shortened walls allow fluid communication between the closed cells.

4. The method of claim 1 further comprising closing a plurality of cells at one or both ends of the body, such that the shortened walls allow fluid communication between the closed cells.

* * * * *